Figure 1:
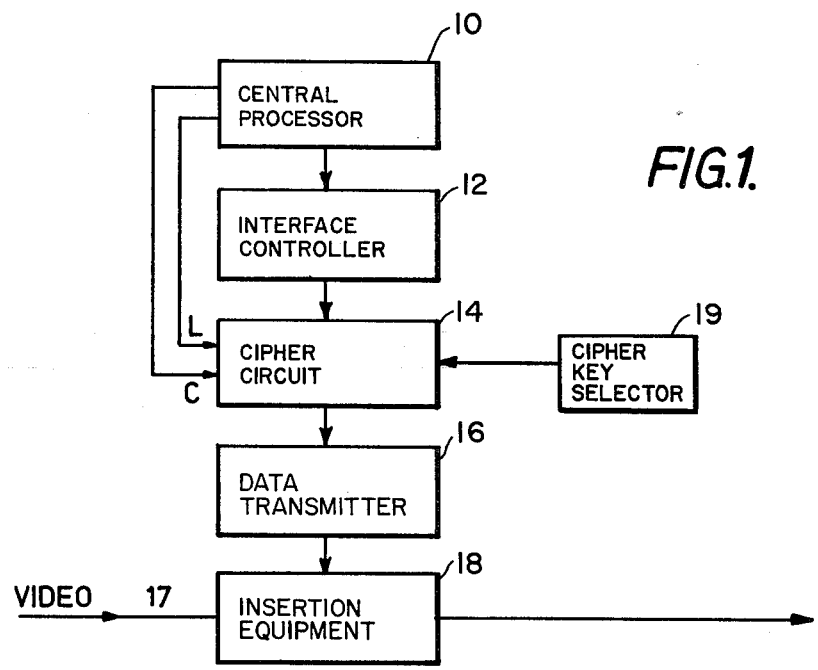

United States Patent [19]
Barrett

[11] 4,205,343
[45] May 27, 1980

[54] TELEVISION SYSTEM TRANSMITTING ENCIPHERED DATA SIGNALS DURING FIELD BLANKING INTERVAL

[75] Inventor: James H. Barrett, London, England

[73] Assignee: Independent Television Companies Association, London, England

[21] Appl. No.: 739,623

[22] Filed: Nov. 8, 1976

[51] Int. Cl.² .............................................. H04N 7/08
[52] U.S. Cl. .................................................. 358/147
[58] Field of Search ............... 358/147, 142, 114, 122, 358/123, 260–261, 259, 138; 178/22

[56] References Cited
U.S. PATENT DOCUMENTS

| | | | |
|---|---|---|---|
| 3,061,672 | 10/1962 | Wyle | 358/261 |
| 3,170,033 | 2/1965 | Vasseur | 178/22 |
| 3,491,199 | 1/1970 | Weinstein | 358/147 |
| 3,493,674 | 2/1970 | Houghton | 358/147 |
| 3,519,736 | 7/1970 | Dorsey | 358/147 |
| 3,659,046 | 4/1972 | Angeleri et al. | 178/22 |
| 3,715,478 | 2/1973 | Vasseur | 358/259 |
| 3,984,624 | 10/1976 | Waggener | 358/142 |

OTHER PUBLICATIONS

Darrington, "Wireless World Teletext Decoder", *Wireless World*, Nov. 1973, pp. 498–504.
Edwardson et al., "Ceefax: A Proposed New Broadcasting Service", Journal of SMPTE, vol. 83, Jan. 1974, pp. 14–19.

*Primary Examiner*—John C. Martin
*Attorney, Agent, or Firm*—Woodard, Weikart, Emhardt & Naughton

[57] ABSTRACT

A television system for broadcasting data simultaneously with but independently of television programs, in which digitally coded information carrying signals are superimposed or otherwise added to a video system in the field blanking interval. The local receiver is fitted with a decoder by means of which a viewer is able to select a particular page of supplementary information which is then superimposed over the broadcast program. Generally, this information is available to any member of the public who has a requisite decoder. In this system the digitally coded information carrying signals are enciphered prior to transmission in accordance with a predetermined key and the receiving terminal has a cipher circuit operable in accordance with the key to decipher the enciphered signals. In a preferred form each cipher circuit is a pseudo-random sequence generator for generating pulses in accordance with the predetermined key and the output of which is connected to one input of a gate, the other gate input being connected to the data signals. By enciphering the signals prior to transmission some pages can be dedicated for the private use of selected viewers to whom the cipher key is available.

8 Claims, 3 Drawing Figures

TELEVISION SYSTEM TRANSMITTING ENCIPHERED DATA SIGNALS DURING FIELD BLANKING INTERVAL

This invention relates to television systems for broadcasting data simultaneously with, but independently of, television programs.

Recently a number of such systems have been proposed for more efficiently utilizing broadcast television channels either by providing supplementary material relating to a program or transmitting additional unrelated information. Among the systems which have been proposed, the ORACLE and CEEFAX systems are best known. The ORACLE system is described in a paper by G. A. McKenzie and entitled "ORACLE—An Information Broadcasting Service Using Data Transmission in the Vertical Interval" and the CEEFAX system is described in a paper by S. M. Edwardson and A. Gee and entitled "CEEFAX: A Proposed New Broadcasting Service". Both papers were published in the Journal of the S.M.P.T.E., Vol. 83, January 1974.

In view of the above mentioned publications, no detailed description of the ORACLE or CEEFAX system will be given. Briefly, digitally coded information carrying signals are superimposed or otherwise added to a video signal in the field blanking interval. The local receiver is fitted with a decoder by means of which a viewer is able to select a particular 'page' of supplementary information and this is then superimposed over the broadcast program. The information is, therefore, available to any member of the public who has the requisite decoder.

According to this invention a television system comprises a transmitting terminal including a source of video signals, means operable to superimpose or otherwise add to the video signal without interfering with the picture signal, digitally coded information carrying signals, and a receiving terminal for displaying a picture corresponding to a picture signal and including means for extracting from the video signal and for storing the information carrying signals and a decoder operable to convert the stored signals into a repetitive vision signal for selective display of the information by the receiver, wherein the digitally coded information carrying signals are enciphered prior to transmission, in accordance with a predetermined key, and wherein the receiving terminal comprises a cipher circuit operable in accordance with the said key to decipher the enciphered signals.

By enciphering the digitally coded signals prior to transmission, some 'pages' can be dedicated for the private use of selected viewers, to whom the cipher key is available. Applying the enciphered signals to a receiver having only a conventional decoder, would produce meaningless colors, graphic symbols etc.

Preferably, the transmitting terminal comprises a cipher circuit identical to the receiving terminal cipher circuit, for enciphering the digitally coded information carrying signals prior to transmission.

The invention also includes a television receiving terminal for use in a television system wherein digitally coded information carrying signals are superimposed or otherwise added to the video signal without interfering with the picture signal and wherein the digitally coded information carrying signals are enciphered prior to transmission in accordance with a predetermined key, the receiving terminal being adapted for displaying a picture corresponding to the picture signal and comprising means for extracting from the video signal and for storing the information carrying signals, a decoder operable to convert the stored signals into a repetitive vision signal for selective display of the information by the receiver, and a cipher circuit operable in accordance with the said key to decipher the enciphered signals.

In a preferred embodiment, each cipher circuit comprises a generator for generating a sequence of pulses in accordance with a predetermined key, and the output of which is connected to one input of a gate, the other gate input being connected to the data signals. Preferably, the generator is a pseudo-random sequence generator.

Figure 2:
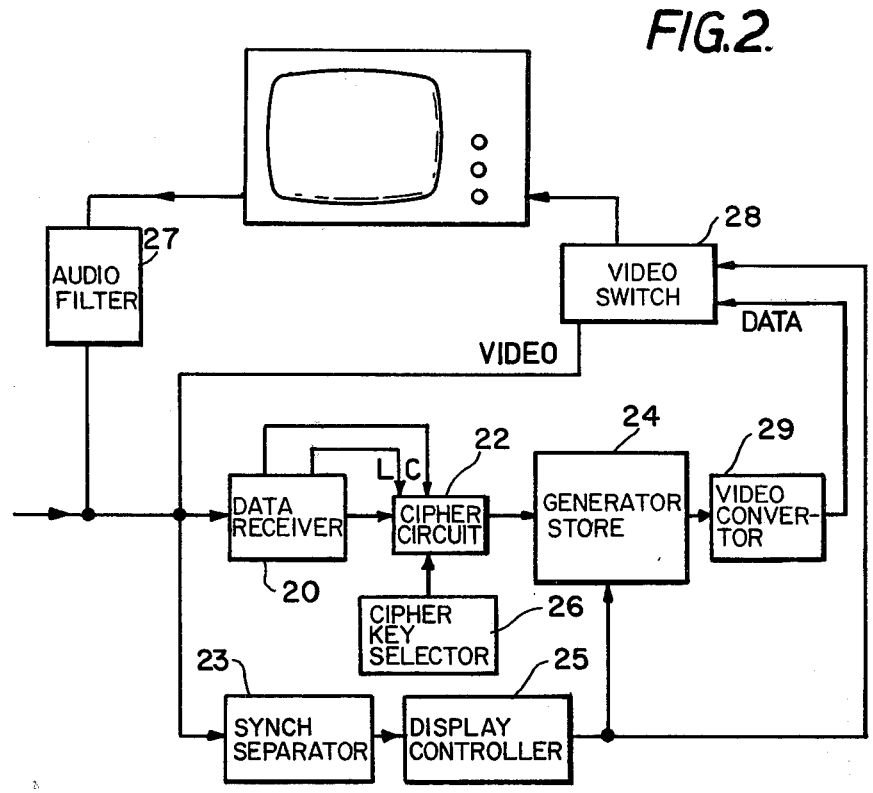
Figure 3:
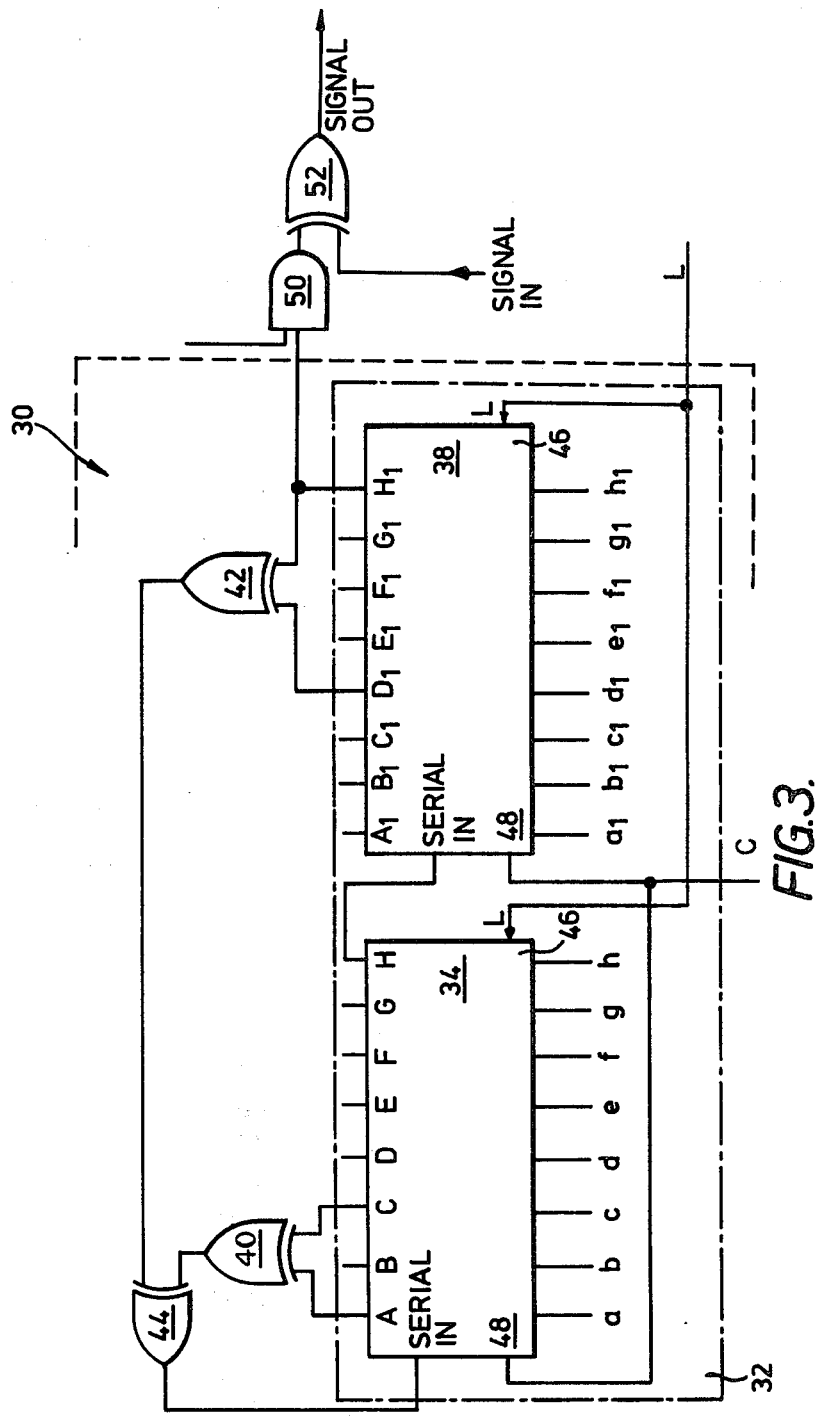

An embodiment of the invention will now be described by way of example with reference to the accompanying drawings, of which:

FIG. 1 is a block diagram of a transmitting terminal;
FIG. 2 is a block diagram of a receiving terminal; and
FIG. 3 is a diagram of a cipher circuit for enciphering or deciphering the digitally coded data signals.

In the current ORACLE and CEEFAX systems data pulses are transmitted on otherwise unused television lines during the field blanking interval using a bit rate of 6.9375 M bit/s, each television data line carrying information for a row of forty 8-bit (including one parity bit) characters. One television frame is referred to as 'page' and consists of twenty four, forty character rows including a page header row which contains information for control and display purposes. The first few characters in each row are clock run-in, framing code and control and row address group characters.

Up to 800 pages of data in the form of digitally coded signals are stored in a central processor unit 10, from which data is passed via interface controller 12. The signals pass bit by bit through a cipher circuit 14 to a data transmitter 16 which actually constructs the signal for insertion equipment 18. The cipher circuit 14 is normally inhibited but is actuable by a control signal from the central processor 10, to encipher the digitally coded information carrying signals, in accordance with a predetermined cipher key set by a selector 19.

Referring now to FIG. 2, the entire video signal is passed to the data receiver 20 which checks for the presence of a unique start code in the page header and then searches for a selected page number. The extracted page of information is fed via a cipher circuit 22 in which the appropriate cipher key is set by selector 26, to the text signal generator input store 24 where the deciphered digitally coded signals are stored so that a complete page can be fed through a data signal video converter 29 and displayed continuously, even after the input to the generator store 24 has been removed.

Timing for the positioning of the data signals is controlled by a display controller 25 which is driven by a standard synch separator 23. As good video frequency response is needed for ORACLE and CEEFAX, a filter 27 is provided to eliminate traces of sound carrier on the video signal.

A video switch 28 enables the stored page of data to be substituted for the normal television picture.

The transmitting cipher circuit 14 and the receiving cipher circuit 22 are identical and can be set to produce an identical sequence of pulses in accordance with a predetermined cipher key. They operate by gating the sequence of pulses respectively with the digitally coded signals from the interface controller 12 in the transmitting terminals, and the video signal at output from the data receiver 20 in the receiving terminal.

If an n-bit shift register has its input controlled by certain of its stages, it can be made to pass through $(2^n-1)$ different states. This device is known as a maximum length sequence generator or a pseudo-random sequence generator. The cipher circuit shown in FIG. 3 includes a pseudo-random sequence generator 30 having a 16-stage shift register 32 made up of two serially connected 8-bit shift registers 34 and 38.

Outputs A and C of the register 34 and outputs $D_1$ and $H_1$ of the register 38 are connected respectively to exclusive OR gates 40 and 42, the outputs of which are connected to a further exclusive OR gate 44 supplying the serial input of the first register 34. The generator 30 has a pseudo-random sequence of $(2^{16}-1)=65,535$ different states.

In use, a preselected 16-bit number is applied to the inputs a–h and $a_1$–$h_1$ and upon receipt of a load signal L at 46, the number is set in the register. The generator 30 is driven by a clock (not shown) providing a clock signal C connected to inputs 48 and supplying pulses in synchronism with the data signal. Each clock pulse shifts the register to a new state.

Output $H_1$ is applied to one input of an AND gate 50, the output of which is gated with the serial input data signal in an exclusive OR gate 52. The other input of the AND gate 50 is a digital control signal and with this control signal set to binary 1, the exclusive OR gate 52 changes a data signal binary 0 to a binary 1 and vice versa, when the output $H_1$ is binary 1 and leaves the bit unchanged when output $H_1$ is binary 0. The cipher circuit is effectively inoperative when the control signal is binary 0, the data signal being passed through the exclusive OR gate 52 without modification.

If required, the digital control signal of input to AND gate 50 may be manually switched or supplied automatically at the transmission terminal, by the central processor 10 or, at the receiver, by the data receiver 20.

The load signal L is generated also by the processor unit 10 or data receiver 20, at the end of the control and row address group of the first row transmitted after row 0 which is the page header row, and each subsequent row, so that only the message need be enciphered or deciphered. Because the encipherment changes throughout the message, unauthorized decipherment is made even more difficult and the system is applicable both to decoders where the receive clock runs continually, and to those where it restarts each line.

The preselected number which constitutes the cipher key, as described above, is set in the register 38 by the selector 26, the number being entered therein by means of, for example, thumb wheels or push buttons.

This latter method produces a more flexible system which is secure against all but computer analysis. If the cipher key (i.e. the preselected number) is changed frequently and is known only to the message originators and the intended viewers, the system can be completely secure. One or more of the bits a to h and $a_1$ to $h_1$ could be made to change with the time of transmission and this would make the information even more difficult to decipher. Similarly, the page or row number may form part of the selecting code.

If high security is desired, messages may be enciphered, using a cipher circuit such as described above, before being passed to the broadcasting agency for transmission.

The above makes reference only to television broadcasting, but it will be understood that the invention is equally useful in closed circuit systems.

What we claim is:

1. A television system receiving terminal for displaying a picture corresponding to the picture signal which terminal is for use with a transmitting terminal which includes a source of video signals, means operable to superimpose, or otherwise add to the video signals without interfering with the picture signal, digitally coded information carrying signals, wherein the digitally coded information carrying signals are enciphered prior to transmission, in accordance with a predetermined key, and including:
   (a) means for extracting the enciphered information carrying signals from the video signals;
   (b) a cipher circuit means, including user operable selection means for selecting a desired key from a number of keys, for operation in accordance with the selected key to decipher received enciphered information carrying signals;
   (c) said cipher circuit means including a generator for generating a sequence of pulses in accordance with the selected key;
   (d) means for storing either the enciphered or the deciphered information carrying signals; and
   (e) a decoder operable to convert the deciphered signals into a repetitive vision signal for selective display by the receiver of the information contained in the information carrying signals.

2. The television receiving terminal of claim 1 which additionally includes means for displaying a picture corresponding to the video signal.

3. The television receiving terminal of claim 1 wherein the generator is a pseudo-random sequence generator.

4. The television system of claim 1 in which the output of said generator is connected to one input of an exclusive OR gate and the other gate input is connected to the ciphered information carrying signals.

5. A television system which comprises:
   a transmitting terminal including:
   (a) means for superimposing, or otherwise adding to the video signals without interfering with the picture signals, digitally coded information carrying signals to the video signals;
   (b) a first cipher circuit means, including user operable selection means for selecting a desired key from a number of keys, for operation in accordance with the selected key to encipher the information carrying signals; and
   (c) said first cipher circuit means including a generator for generating a sequence of pulses in accordance with the selected key;
   and a receiving terminal including:
   (d) means for extracting the enciphered information carrying signals from the video signals;
   (e) a second cipher circuit means, including user operable selection means for selecting a desired key from a number of keys, for operation in accordance with the selected key to decipher received enciphered information carrying signals;
   (f) means for storing either the enciphered or the deciphered information carrying signals; and
   (g) a decoder operable to convert the deciphered signals into a repetitive vision signal for selective display by the receiver of the information contained in the information carrying signals.

6. The television system of claim 5 wherein the generator of the transmitting terminal is a pseudo-random sequence generator.

7. The television system of claim 5 which includes means for transmitting the information carrying signals on television lines in the field blanking interval.

8. The television system of claim 5 in which the output of said generator is connected to one input of an exclusive OR gate and the other gate input is connected to the information carrying signals.

* * * * *